E. DE TEIXEIRA.
TABLE IMPLEMENT.
APPLICATION FILED OCT. 9, 1918.

1,353,090.

Patented Sept. 14, 1920.
2 SHEETS—SHEET 1.

WITNESSES

INVENTOR
E. de Teixeira
BY
ATTORNEYS

E. DE TEIXEIRA.
TABLE IMPLEMENT.
APPLICATION FILED OCT. 9, 1918.
1,353,090. Patented Sept. 14, 1920.
2 SHEETS—SHEET 2.
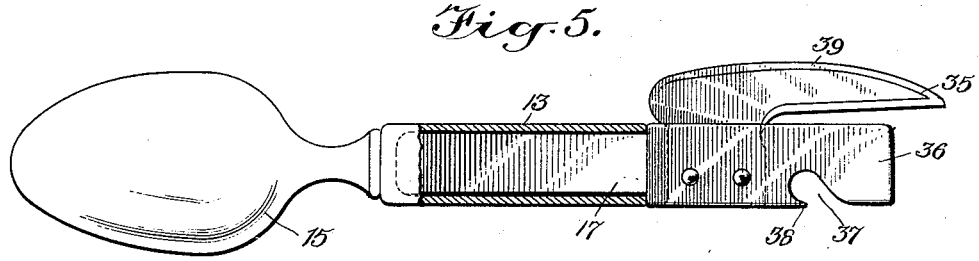
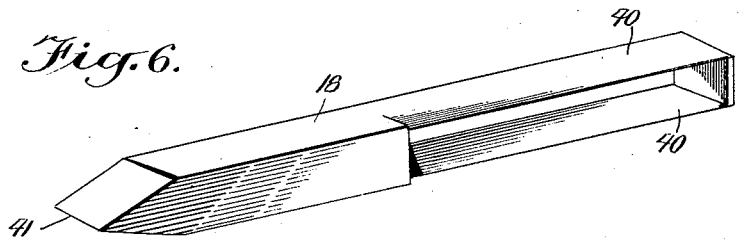
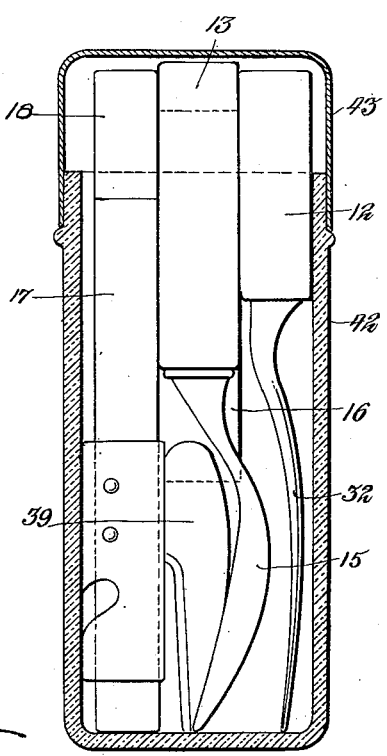
WITNESSES
INVENTOR
E. de Teixeira
BY
ATTORNEYS

UNITED STATES PATENT OFFICE.

EUGENIO DE TEIXEIRA, OF SETAUKET, NEW YORK, ASSIGNOR TO ANNA L. H. DE TEIXEIRA, OF SETAUKET, NEW YORK.

TABLE IMPLEMENT.

1,353,090. Specification of Letters Patent. Patented Sept. 14, 1920.

Application filed October 9, 1918. Serial No. 257,442.

*To all whom it may concern:*

Be it known that I, EUGENIO DE TEIXEIRA, a subject of the King of Spain, and a resident of Setauket, in the county of Suffolk and State of New York, have invented a new and Improved Table Implement, of which the following is a full, clear, and exact description.

Among the principal objects which the present invention has in view are: to provide a single implement for numerous uses, to meet the several demands for the preparation of food for personal consumption, to economize the transportation space, and to avoid loss of implements.

Drawings.

Fig. 5 is a face view partly in section of a modified form of the invention;

Fig. 6 is a detail view showing one of the attachments or accessories of the implement;

Fig. 7 is a vertical section of a container case or packet for the implement.

Figure 1:
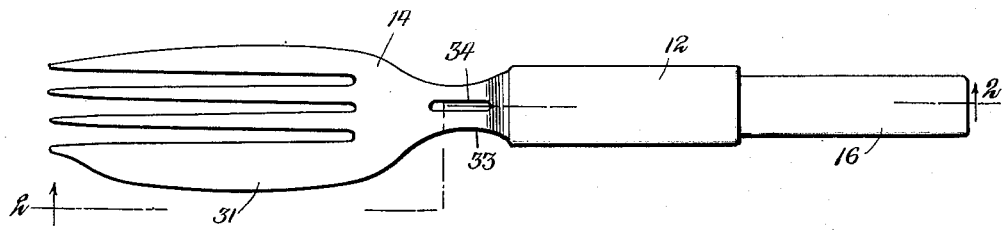
Figure 1 is a face view of an implement of the character mentioned constructed and arranged in accordance with the present invention.

Description.

As seen in the drawings, hollow sheath handles 12 and 13 are used, the first being integrally connected with a table fork 14, and the latter with a spoon 15. The sockets of the sheaths 12 and 13 are provided to receive at will the frames or shanks 16, 17 and 18 of the various implements disclosed in the drawings. Thus the sheath 12 has an opening 19, through which may swing when actively adjusted, a corkscrew 20 and a nut-cracker 21. The nut-cracker 21 has a hollow chamber 22, wherein the corkscrew 20 rests when inactively disposed. Between the sides of the nut-cracker 21 and extending through the chamber 22 is a pivot pin 23 on which the corkscrew swings. A spring 24 bears upon the two sides of the inner end of the corkscrew to retain the same in the inactive and active positions thereof.

Figure 2:
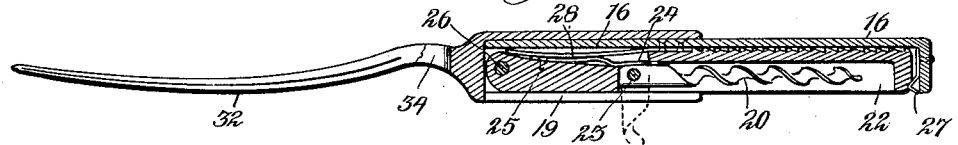
Fig. 2 is a longitudinal section thereof, the section being taken as on the line 2—2 in Fig. 1.
Figure 3:
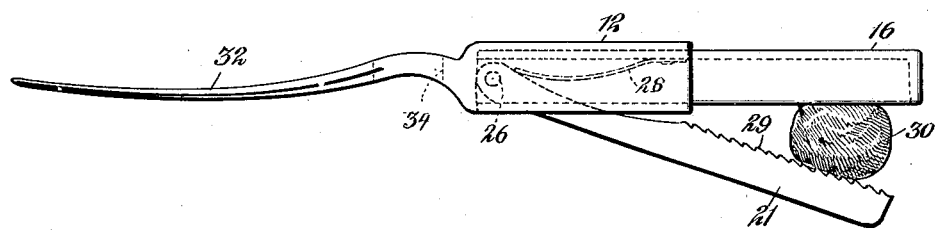
Fig. 3 is an edge view of the same, showing the implement as arranged for one of its various uses.
Figure 4:
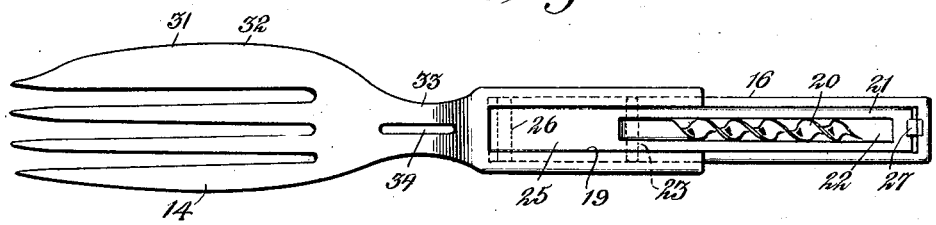
Fig. 4 is a back view of the implement shown in Fig. 1, the view being taken from the reverse side thereof.

As seen best in Fig. 2 of the drawings, the spring 24 is held in service relation to the body of the nut-cracker 21, by a screw 25. The nut cracker 21 is pivoted on the pin 26 within a recess of the frame 16. The said nut-cracker is inactively held within the recess by a latch spring 27. When the latch spring is removed, the flat leaf spring 28 moves the cracker to the position shown in Fig. 3 of the drawings. The nut-cracker 21 is provided on the upper surface or back thereof with tooth-like serrations 29, which serve to grip an article such as a nut 30, to hold the same firmly in conjunction with the edges of the recess in the shank 16. When the nut is so held, it can be easily broken or cracked by placing the cracker on any suitable resisting surface while striking the shank 16 above the same.

At one side of the fork 14, the tine is extended to form a blade 31. The blade 31 has a sharp cutting edge 32, which may be used as a cutting implement.

The narrow portion or throat 33 of the fork has a slot 34 formed therein, which may be utilized for engaging the tab ends provided on some forms of cans by which the tops or covers thereof may be severed from the body of the cans. The forward end of the blade 31 is blunted to coöperate with the other tines of the fork 14.

For cans not provided with the tabs above referred to, there is employed an opener having a cutting blade 35. The blade 35 is held in service relation to the fulcrum plate 36. The plate 36 has a recess 37 formed in the side thereof, to provide a toe 38, which may be extended under the overhang of a bottle cover or stopper, such as the crimped stopper of commerce.

The back edge 39 of the blade 35 is sharpened to be employed for cutting or splitting articles, such as wood or bones. When used for this purpose, the extreme end of the shank 17 may be used as a handle for striking.

The implement shown in Fig. 6 of the drawings has extended from the shank 18, the sharpened blades 40, which may be employed when the shank 18 is placed within the handle 13 for peeling the skin from fruits or vegetables. The wedge-shaped end 41 of the shank 18 is employed for cutting ice or similar service.

The container shown in Fig. 7 of the drawings is provided so that the various articles may be placed therein for transportation. When placing these articles in the container, care is exercised that the handle 13 with the spoon 15 is placed above the handle 12 and the fork 14. The frames 16, 17 and 18 are disposed in clustered relation, the blade 35 of the frame 17 being so disposed as to rest in superposed relation to said fork and spoon.

The body 42 of the container is preferably constructed of glass for adaptation to use as a receptacle for liquid, such as coffee or water. The cover 43 thereof is formed to a size convenient for use as a coat or a trunk utensil.

When the tools are packed within the container, it is obvious that the space employed is considerably less than that which would be required for a series of individual implements constructed to perform the various offices above set forth.

Claim.

An implement having a shank associated with such implement, such shank being provided with an upper and side walls, the lower edges of such side walls being bent inwardly toward one another and having their edges spaced, said shank being adapted to receive a second implement, the space between such inturned edges being adapted to permit of a moving of certain parts of such second implement.

EUGENIO DE TEIXEIRA.